(12) United States Patent
Suzuki et al.

(10) Patent No.: US 11,375,546 B2
(45) Date of Patent: Jun. 28, 2022

(54) TERMINAL DEVICE, BASE STATION DEVICE, AND COMMUNICATION METHOD FOR PERFORMING RANDOM ACCESS PROCEDURE

(71) Applicants: Sharp Kabushiki Kaisha, Sakai (JP); FG Innovation Company Limited, Tuen Mun (HK)

(72) Inventors: Shoichi Suzuki, Sakai (JP); Wataru Ouchi, Sakai (JP); Tomoki Yoshimura, Sakai (JP); Liqing Liu, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 89 days.

(21) Appl. No.: 16/476,902

(22) PCT Filed: Jan. 5, 2018

(86) PCT No.: PCT/JP2018/000077
§ 371 (c)(1),
(2) Date: Jul. 10, 2019

(87) PCT Pub. No.: WO2018/131538
PCT Pub. Date: Jul. 19, 2018

(65) Prior Publication Data
US 2020/0008244 A1    Jan. 2, 2020

(30) Foreign Application Priority Data

Jan. 10, 2017  (JP) ............................. JP2017-001870

(51) Int. Cl.
*H04W 74/08*    (2009.01)
*H04W 76/27*    (2018.01)
(Continued)

(52) U.S. Cl.
CPC ....... *H04W 74/0833* (2013.01); *H04W 74/04* (2013.01); *H04W 76/10* (2018.02); *H04W 76/27* (2018.02)

(58) Field of Classification Search
CPC ............. H04W 74/0833; H04W 74/04; H04W 76/27; H04W 76/10
See application file for complete search history.

(56) References Cited

U.S. PATENT DOCUMENTS

2016/0057800 A1* 2/2016 Ingale ................... H04W 76/18
                                                          370/216
2017/0019930 A1* 1/2017 Lee .................... H04W 72/0413
(Continued)

FOREIGN PATENT DOCUMENTS

| EP | 3557938 A1 | 10/2019 |
|---|---|---|
| JP | 2016-532391 A | 10/2016 |
| WO | 2015137632 | 9/2015 |

OTHER PUBLICATIONS

Official Communication issued in International Patent Application No. PCT/JP2018/000077, dated Mar. 27, 2018.
(Continued)

*Primary Examiner* — Ricky Q Ngo
*Assistant Examiner* — Stephen N Steiner
(74) *Attorney, Agent, or Firm* — ScienBiziP, P.C.

(57) ABSTRACT

A terminal apparatus performs a random access procedure; and receives a physical channel, in which the random access procedure includes a 2 step contention based random access procedure, a 4 step contention based random access procedure, and a non-contention based random access procedure, and the physical channel indicates an initiation of any of the 4 step contention based random access procedure and the non-contention based random access procedure.

4 Claims, 11 Drawing Sheets

(51) Int. Cl.
 *H04W 76/10* (2018.01)
 *H04W 74/04* (2009.01)

(56) References Cited

U.S. PATENT DOCUMENTS

2018/0110074 A1* 4/2018 Akkarakaran .... H04W 72/0413
2019/0174434 A1* 6/2019 Koskinen .............. H04W 52/50
2020/0037297 A1* 1/2020 Pan ...................... H04B 7/0695

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015, pp. 1-142.
"3rd Generation Partnership Project; Technical Specification Group Radio Access Network; Evolved Universal Terrestrial Radio Access (E-UTRA); Multiplexing and channel coding (Release 13)", 3GPP TS 36.212 V13.0.0, Dec. 2015, pp. 1-121.
"3rd Generation Partnership Project; Technical Specification Group Radio Access Network; Evolved Universal Terrestrial Radio Access (E-UTRA); Physical layer procedures (Release 13)", 3GPP TS 36.213 V13.0.0, Dec. 2015, pp. 1-326.
"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.0.0, Dec. 2015, pp. 1-82.
"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.0.0, Dec. 2015, pp. 1-507.
Nokia, "Motivation for new SI proposal: Enhancements to initial access and scheduling for low-latency LTE", RP-162295, RAN#74, Dec. 5-8, 2016, pp. 1-5.
Intel Corporation, "2-Step random access procedure in NR", 3GPP TSG-RAN WG2 #96, R2-168520, Nov. 14-18, 2016, 5 pages.
Qualcomm Incorporated, "2 step and 4 step RACH", 3GPP TSG-RAN WG1 #87, R1-1612033, Nov. 14-18, 2016, 4 pages.
Nokia et al., "Way Forward on Two-Step RACH Procedure", 3GPP TSG RAN WG1 #87, R1-1613685, Nov. 14-18, 2016, 6 pages.
NTT Docomo Inc:"RAN2 aspects on random access procedure for NR", 3GPP Draft; R2-168035, 3rd Generation Partnership Project(3GPP), Mobile Competence Centre; 650, Route Des Lucioles; F-06921 Sophia-Antipolis Cedex; France, vol. RAN WG2, No. Reno,USA, Nov. 14, 2016-Nov. 18, 2016 , Nov. 13, 2016(Nov. 13, 2016), XP051177734, Retrieved from the Internet: URL:http://www.3gpp.org/ftp/Meetings_3GPP_SYNC/RAN2/Docs/,[retrieved on Nov. 13, 2016],*section 2.1. RA procedure forms*.
Nokia Alcatel-Lucent Shanghai Bell: "Considerations on NR RACH procedures" 3GPP Draft; R2-168013 Considerations on NR RACH Procedures, 3rd Generation Partnership Project (3GPP),Mobile Competence Centre; 650,Route Des Lucioles; F-06921 Sophia-Antipolis Cedex;France, vol. RAN WG2, No. Reno,USA;Nov. 14, 2016-Nov. 18, 2016, Nov. 13, 2016(Nov. 13, 2016), XP051177720, Retrieved from the Internet: URL:http://www.3gpp.org/ftp/Meetings_3GPP_SYNC/RAN2/Docs/,[retrieved on Nov. 13, 2016],*section2.1 Possible NR RACH procedure* *section 2.2.1 Use cases and scenarios*.

* cited by examiner

| EVENT | 4 STEP CONTENTION BASED RANDOM ACCESS PROCEDURE | 2 STEP CONTENTION BASED RANDOM ACCESS PROCEDURE | NON-CONTENTION BASED RANDOM ACCESS PROCEDURE |
|---|---|---|---|
| (i) INITIAL ACCESS | VALID | VALID | INVALID |
| (ii) RRC CONNECTION RE-ESTABLISHMENT | VALID | VALID | INVALID |
| (iii) HANDOVER | VALID | VALID | VALID |
| (iv) DOWNLINK DATA ARRIVAL | VALID | INVALID | VALID |
| (v) UPLINK DATA ARRIVAL | VALID | VALID | INVALID |
| (vi) TIME ADJUSTMENT FOR sTAG | INVALID | INVALID | VALID |

FIG. 10

| EVENT | 4 STEP CONTENTION BASED RANDOM ACCESS PROCEDURE | 2 STEP CONTENTION BASED RANDOM ACCESS PROCEDURE | NON-CONTENTION BASED RANDOM ACCESS PROCEDURE |
|---|---|---|---|
| (A) CASE THAT RANDOM ACCESS PROCEDURE IS INITIATED BY RRC | VALID | VALID | VALID |
| (B) CASE THAT MAC ITSELF INITIATES RANDOM ACCESS PROCEDURE | VALID | VALID | INVALID |
| (C) CASE THAT RANDOM ACCESS PROCEDURE IN PRIMARY CELL IS INITIATED BASED ON PDCCH ORDER | VALID | INVALID | VALID |
| (D) CASE THAT RANDOM ACCESS PROCEDURE IN SECONDARY CELL IS INITIATED BASED ON PDCCH ORDER | INVALID | INVALID | VALID |

FIG. 11

TERMINAL DEVICE, BASE STATION DEVICE, AND COMMUNICATION METHOD FOR PERFORMING RANDOM ACCESS PROCEDURE

TECHNICAL FIELD

The present invention relates to a terminal apparatus, a base station apparatus, a communication method, and an integrated circuit.

This application claims priority based on JP 2017-001870 filed on Jan. 10, 2017, the contents of which are incorporated herein by reference.

BACKGROUND ART

A radio access method and a radio network for cellular mobile communications (hereinafter, referred to as "Long Term Evolution (LTE: Registered Trademark)", or "Evolved Universal Terrestrial Radio Access (EUTRA)") have been studied in the 3rd Generation Partnership Project (3GPP) (NPLs 1, 2, 3, 4, and 5). Further, in 3GPP, a new radio access method (hereinafter referred to as "New Radio (NR)") is being studied. In LTE, a base station apparatus is also referred to as an evolved NodeB (eNodeB). In NR, the base station apparatus is also referred to as gNodeB. In LTE, and in NR, a terminal apparatus is also referred to as a User Equipment (UE). LTE, as well as NR, is a cellular communication system in which multiple areas are deployed in a cellular structure, with each of the multiple areas being covered by a base station apparatus. A single base station apparatus may manage a plurality of cells.

In NPL 6, it has been proposed to discuss a technique for reducing latency and/or overhead of an initial access procedure and a random access procedure (NPL 6).

CITATION LIST

Non Patent Literature

NPL 1: "3GPP TS 36.211 V13.0.0 (2015-12)", 6 Jan. 2016.
NPL 2: "3GPP TS 36.212 V13.0.0 (2015-12)", 6 Jan. 2016.
NPL 3: "3GPP TS 36.213 V13.0.0 (2015-12)", 6 Jan. 2016.
NPL 4: "3GPP TS 36.321 V13.0.0 (2015-12)", 14 Jan. 2016.
NPL 5: "3GPP TS 36.331 V13.0.0 (2015-12)", 7 Jan. 2016.
NPL 6: "Motivation for new SI proposal: Enhancements to initial access and scheduling for low-latency LTE", RP-162295, 5 Dec. 2016.

SUMMARY OF INVENTION

Technical Problem

An aspect of the present invention provides a terminal apparatus capable of efficiently performing random access with a base station apparatus, a base station apparatus for communicating with the terminal apparatus, a communication method used for the terminal apparatus, a communication method used for the base station apparatus, an integrated circuit mounted on the terminal apparatus, and an integrated circuit mounted on the base station apparatus.

Solution to Problem (1) According to some aspects of the present invention, the following measures are provided. That is, a first aspect of the present invention is a terminal apparatus, the terminal apparatus includes: a higher layer processing unit configured to perform a random access procedure; and a receiver configured to receive a physical channel, in which the random access procedure includes a 2 step contention based random access procedure, a 4 step contention based random access procedure, and a non-contention based random access procedure, the physical channel indicates an initiation of any of the 4 step contention based random access procedure and the non-contention based random access procedure, and the higher layer processing unit initiates, based on the physical channel, any of the 4 step contention based random access procedure and the non-contention based random access procedure.

(2) A second aspect of the present invention is a communication method used for a terminal apparatus 1, the communication method includes the steps of: performing a random access procedure; and receiving a physical channel, in which the random access procedure includes a 2 step contention based random access procedure, a 4 step contention based random access procedure, and a non-contention based random access procedure, the physical channel indicates an initiation of any of the 4 step contention based random access procedure and the non-contention based random access procedure, and based on the physical channel, any of the 4 step contention based random access procedure and the non-contention based random access procedure is started.

Advantageous Effects of Invention

According to one aspect of the present invention, a terminal apparatus and a base station apparatus can efficiently perform a random access procedure.

BRIEF DESCRIPTION OF DRAWINGS

FIG. 10 is a diagram illustrating an example of a correspondence between an event and a form of a random access procedure according to the present embodiment.

FIG. 11 is a diagram illustrating another example of the correspondence between the event and the form of the random access procedure according to the present embodiment.

DESCRIPTION OF EMBODIMENTS

Embodiments of the present invention will be described below.

Figure 1:
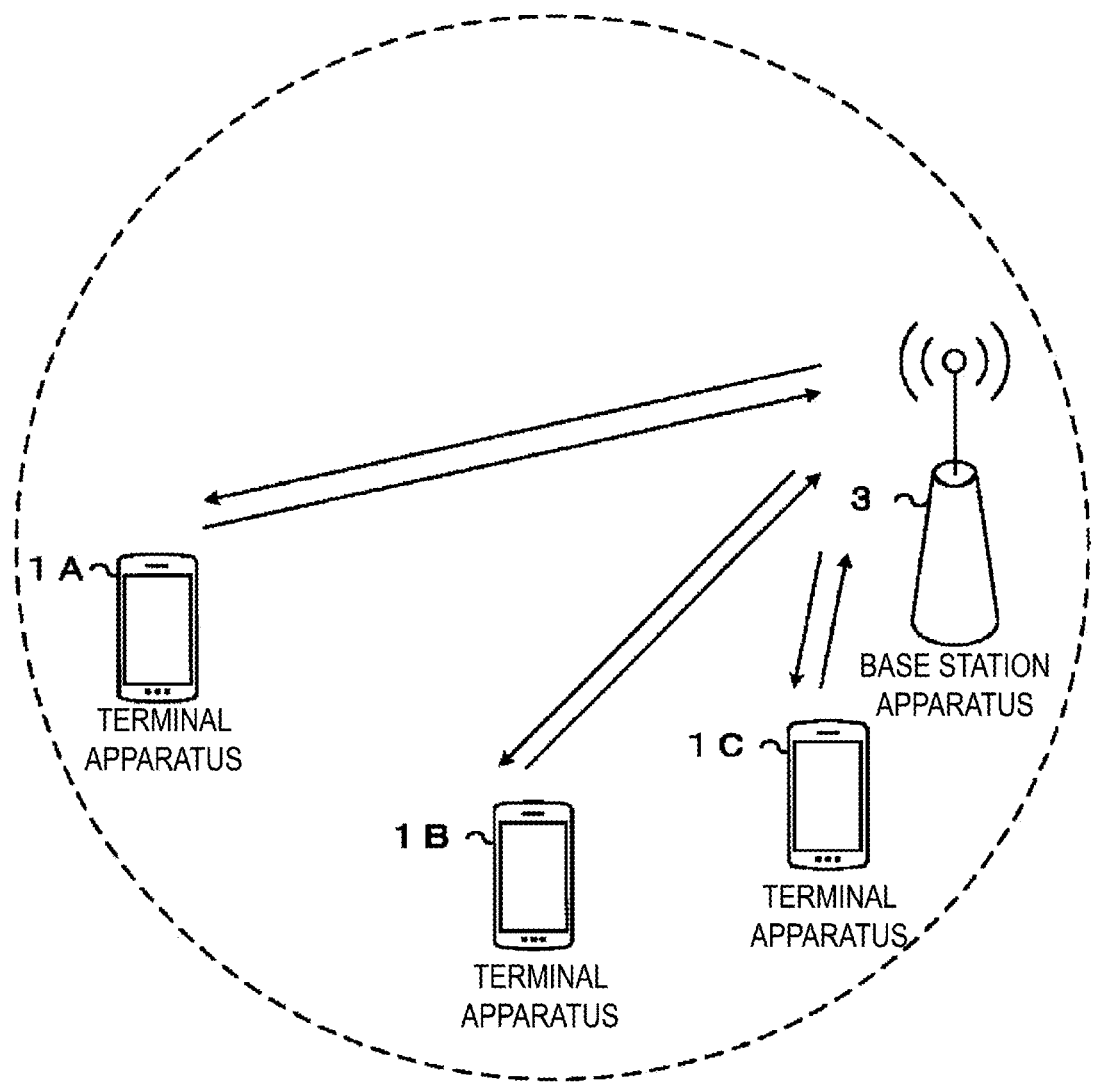
FIG. 1 is a conceptual diagram of a radio communication system according to the present embodiment.

FIG. 1 is a conceptual diagram of a radio communication system according to the present embodiment. In FIG. 1, the radio communication system includes a terminal apparatus 1 and a base station apparatus 3. The base station apparatus 3 includes a source base station apparatus 3A, a target base station apparatus 3B, and a Mobility Management Entity (MME)/Gateway (GW). Uu is a radio access link between the terminal apparatus 1 and the base station apparatus 3. Uu includes an uplink from the terminal apparatus 1 to the base station apparatus 3 and a downlink from the base station apparatus 3 to the terminal apparatus 1. X2 is a backhaul link between the source base station apparatus 3A and the target base station apparatus 3B. S1 is a backhaul link between the source base station apparatus 3A/target base station apparatus 3B and the MME/GW.

The terminal apparatus 1 may perform a handover from the source base station apparatus 3A to the target base station apparatus 3B. The terminal apparatus 1 may perform a handover from a source cell to a target cell. The source cell may be managed by the source base station apparatus 3A. The target cell may be managed by the target base station apparatus 3B. The source base station apparatus 3A and the target base station apparatus 3B may be the same apparatus. In other words, the terminal apparatus 1 may perform a handover from the source cell managed by the source base station apparatus 3A to the target cell managed by the source base station apparatus 3A. The source cell is also referred to as a source primary cell. The target cell is also referred to as a target primary cell.

Hereinafter, carrier aggregation will be described.

According to the present embodiment, a plurality of serving cells is configured for the terminal apparatus 1. A technology in which the terminal apparatus 1 communicates via the plurality of serving cells is referred to as cell aggregation or carrier aggregation. In the carrier aggregation, the configured plurality of serving cells is also referred to as aggregated serving cells.

Time Division Duplex (TDD) and/or Frequency Division Duplex (FDD) is applied to the radio communication system in the present embodiment. For cell aggregation, TDD may be applied to all multiple serving cells. Alternatively, in a case of the cell aggregation, serving cells to which TDD is applied and serving cells to which FDD is applied may be aggregated. In the present embodiment, the serving cell to which the TDD is applied is also referred to as a TDD serving cell.

The multiple serving cells configured include one primary cell and one or more secondary cells. The primary cell is a serving cell in which an initial connection establishment procedure has been performed, a serving cell in which a Radio Resource Control connection re-establishment (RRC connection re-establishment) procedure has been initiated, or a cell indicated as a primary cell during a handover procedure. The secondary cell may be configured at a point of time when or after a Radio Resource Control (RRC) connection is established.

The primary cell may include the source primary cell and the target primary cell.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission of a plurality of physical channels/a plurality of physical signals in a plurality of serving cells (component carriers) which is aggregated. The terminal apparatus 1 can perform simultaneous reception of a plurality of physical channels/a plurality of physical signals in a plurality of serving cells (component carriers) which is aggregated.

In a case that DC is configured for the terminal apparatus, a Master Cell Group (MCG) is a subset of all serving cells, and a Secondary Cell Group (SCG) is a subset of serving cells that are not part of the MCG. In a case that the DC is not configured for the terminal apparatus, the MCG includes all the serving cells. The MCG includes a primary cell and zero or more than zero secondary cells. The SCG includes a primary secondary cell and zero or more than zero secondary cells.

The MCG may include one primary TAG and zero or more than zero secondary TAGs. The SCG may include one primary TAG and zero or more than zero secondary TAGs.

A Timing Advance Group (TAG) is a group of serving cells configured by Radio Resource Control (RRC). The same value of a timing advance is applied to the serving cells included in the same TAG. The timing advance is used to adjust PUSCH/PUCCH/SRS/DMRS transmission timing in the serving cell. The primary TAG of the MCG may include a primary cell and zero or more than zero secondary cells. The primary TAG of the SCG may include a primary secondary cell and zero or more than zero secondary cells. The secondary TAG may include one or more than one secondary cell. The secondary TAG does not include a primary cell and a primary secondary cell.

Figure 2:
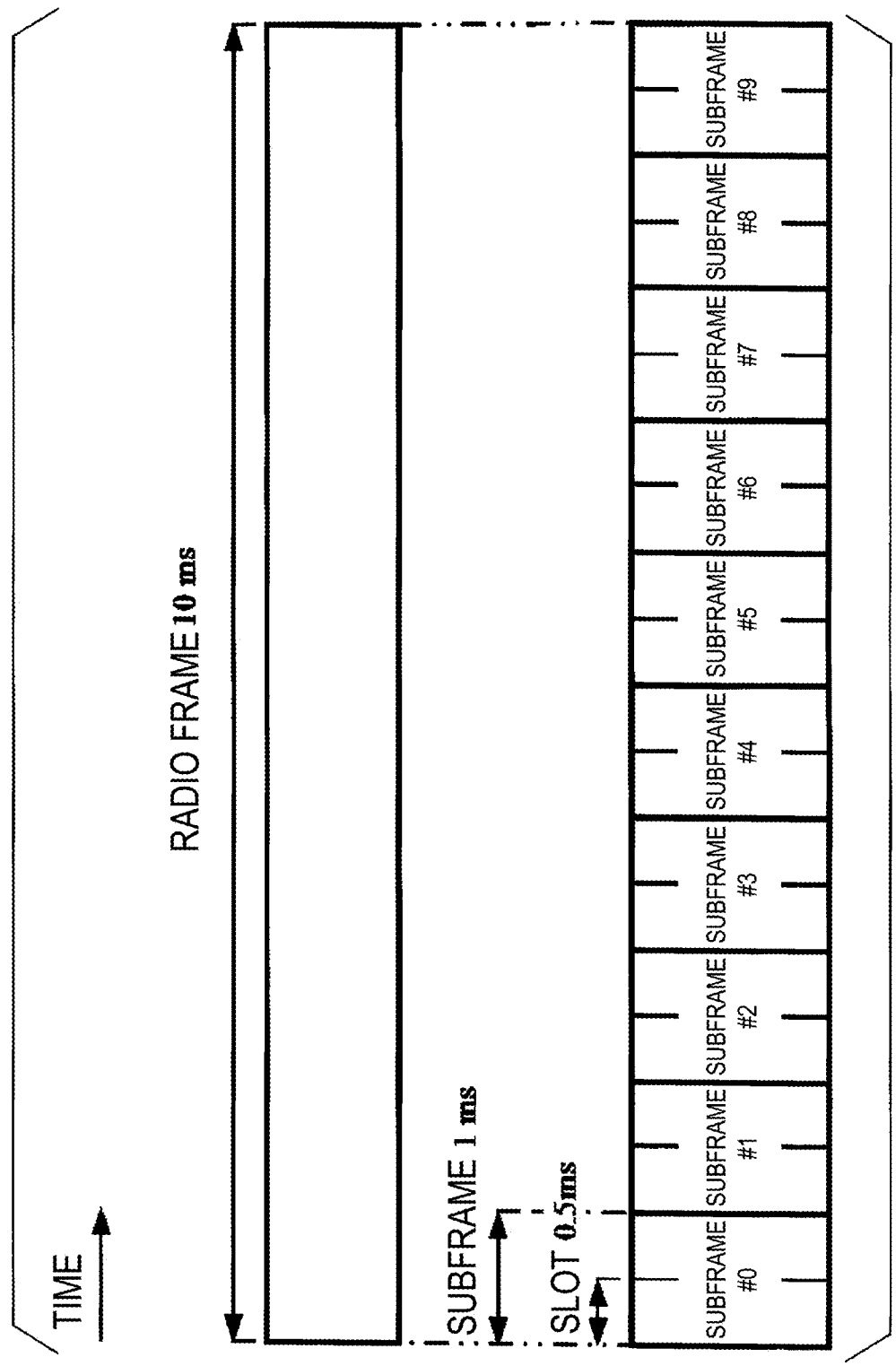
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis.

Various field sizes in a time domain are expressed by the number of time units $T_s=1/(15000 \cdot 2048)$ seconds. A length of the radio frame is $T_f=307200 \cdot T_s=10$ ms (milliseconds). Each of the radio frames includes ten contiguous subframes in the time domain. A length of each subframe is $T_{subframe}=30720 \cdot T_s=1$ ms. Each subframe i includes two contiguous slots in the time domain. The two contiguous slots in the time domain are a slot having a slot number $n_s$ of 2i in the radio frame and a slot having a slot number $n_s$ of 2i+1 in the radio frame. The length of each slot is $T_{slot}=153600 \cdot n_s=0.5$ ms. Each of the radio frames includes ten contiguous subframes in the time domain. Each of the radio frames includes 20 contiguous slots ($n_s=0, 1, \ldots, 19$) in the time domain. A subframe is also referred to as a Transmission Time Interval (TTI).

Figure 3:
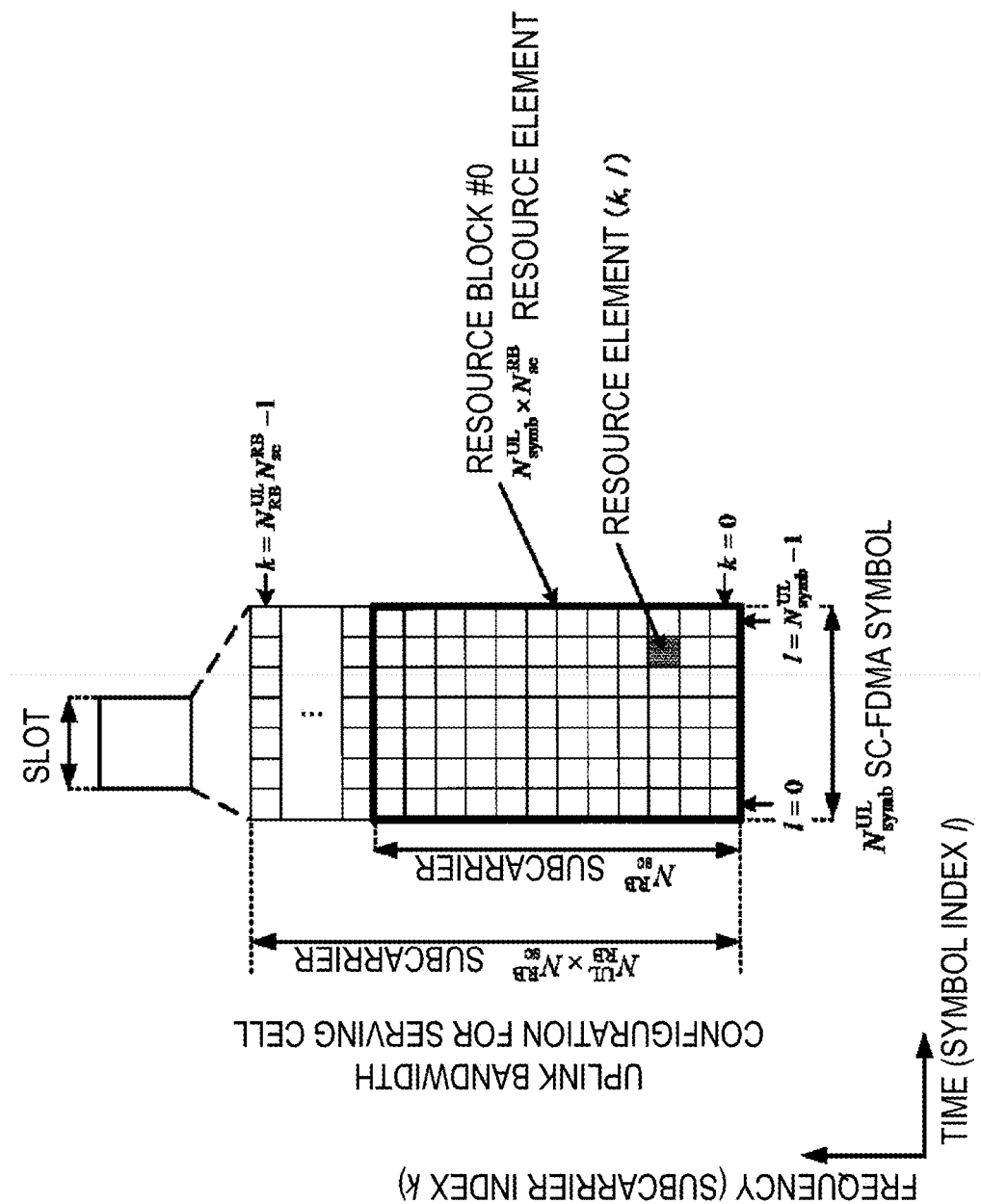
FIG. 3 is a diagram illustrating a schematic configuration of an uplink slot according to the present embodiment.

A configuration of a slot according to the present embodiment will be described below. FIG. 3 is a diagram illustrating a schematic configuration of an uplink slot according to the present embodiment. FIG. 3 illustrates a configuration of an uplink slot in a cell. In FIG. 3, the horizontal axis is a time axis, and the vertical axis is a frequency axis. In FIG. 3, l is a Single Carrier-Frequency Division Multiple Access (SC-FDMA) symbol number/index, and k is a subcarrier number/index.

The physical signal or the physical channel transmitted in each of the slots is expressed by a resource grid. In uplink, the resource grid is defined by multiple subcarriers and multiple SC-FDMA symbols. Each element within the resource grid is referred to as a resource element. The resource element is expressed by the subcarrier number/index k and the SC-FDMA symbol number/index l.

The resource grid is defined for each antenna port. In the present embodiment, description is given for one antenna port. The present embodiment may be applied to each of multiple antenna ports.

The uplink slot includes multiple SC-FDMA symbols l (l=0, 1, . . . , $N^{UL}_{symb}$) in the time domain. $N^{UL}_{symb}$ indicates the number of SC-FDMA symbols included in one uplink slot. For a normal Cyclic Prefix (normal CP), $N^{UL}_{symb}$ is 7. For an extended Cyclic Prefix (extended CP), $N^{UL}_{symb}$ is 6.

The uplink slot includes a plurality of subcarriers k (k=0, 1, . . . , $N^{UL}_{RB} \times N^{RB}_{sc}$) in a frequency domain. $N^{UL}_{RB}$ is an uplink bandwidth configuration for the serving cell expressed by a multiple of $N^{RB}_{sc}$. $N^{RB}_{sc}$ is a (physical) resource block size in the frequency domain expressed by the number of subcarriers. In the present embodiment, the subcarrier interval Δf is 15 kHz, $N^{RB}_{sc}$ is a size of 12 subcarriers. That is, in the present embodiment, $N^{RB}_{sc}$ is 180 kHz.

A resource block is used to express mapping of a physical channel to resource elements. For the resource block, a virtual resource block and a physical resource block are defined. The physical channel is first mapped to the virtual resource block. Thereafter, the virtual resource block is mapped to the physical resource block. One physical resource block is defined by $N^{UL}_{symb}$ consecutive SC-FDMA symbols in the time domain and by $N^{RB}_{sc}$ consecutive subcarriers in the frequency domain. Hence, one physical resource block is constituted by ($N^{UL}_{symb} \times N^{RB}_{sc}$) resource elements. One physical resource block corresponds to one slot in the time domain. The physical resource blocks are numbered (0, 1, . . . , $N^{UL}_{RB}-1$) in ascending order of frequencies in the frequency domain.

The downlink slot according to the present embodiment includes a plurality of OFDM symbols. Since the configuration of the downlink slot according to the present embodiment is the same except for a point that the resource grid is defined by multiple subcarriers and multiple OFDM symbols, the description of the configuration of the downlink slot will be omitted.

Physical channels and physical signals according to the present embodiment will be described.

In FIG. 1, in uplink radio communication from the terminal apparatus 1 to the base station apparatus 3, the following uplink physical channels are used. The uplink physical channels are used by a physical layer for transmission of information output from a higher layer.

Physical Uplink Control CHannel (PUCCH)
Physical Uplink Shared CHannel (PUSCH)
Physical Random Access CHannel (PRACH)

The PUCCH is used to transmit Uplink Control Information (UCI). The uplink control information includes: downlink Channel State Information (CSI); a Scheduling Request (SR) used to request for a PUSCH (Uplink-Shared CHannel (UL-SCH)) resource for initial transmission; and a Hybrid Automatic Repeat request ACKnowledgement (HARQ-ACK) for downlink data (a Transport block, a Medium Access Control Protocol Data Unit (MAC PDU), a Downlink-Shared CHannel (DL-SCH), or a Physical Downlink Shared CHannel (PDSCH)). The HARQ-ACK indicates an acknowledgement (ACK) or a negative-acknowledgement (NACK). The HARQ-ACK is also referred to as HARQ feedback, HARQ information, HARQ control information, and ACK/NACK.

The PUSCH is used for transmission of uplink data (UpLink-Shared CHannel (UL-SCH)). The PUSCH may be used to transmit the HARQ-ACK and/or channel state information along with the uplink data. Furthermore, the PUSCH may be used to transmit only the channel state information or to transmit only the HARQ-ACK and the channel state information. The PUSCH is used to transmit a random access message 3.

The PRACH is used to transmit a random access preamble (random access message 1). The PRACH is used for indicating the initial connection establishment procedure, the handover procedure, the connection re-establishment procedure, synchronization (timing adjustment) for uplink transmission, and the request for the PUSCH (UL-SCH) resource.

The random access preamble may be given by cyclic-shifting a Zadoff-Chu sequence corresponding to a physical root sequence index u. The Zadoff-Chu sequence is generated based on the physical root sequence index u. In one cell, multiple random access preambles may be defined. The random access preamble may be specified by an index of the random access preamble. Different random access preambles corresponding to different indexes of the random access preamble correspond to different combinations of the physical root sequence index u and the cyclic shift, respectively. The physical root sequence index u and the cyclic shift may be given based at least on information included in system information.

The Zadoff-Chu sequence $x_u$ (n) corresponding to the physical root sequence index u is given by Equation (1) described below. Here, e is a Napier's constant. $N_{ZC}$ is a length of the Zadoff-Chu sequence $x_u$ (n). Additionally, n is an integer incremented from 0 to $N_{ZC}-1$.

$$x_u(n)e^{-j\frac{\pi u n(n+1)}{N_{ZC}}}, 0 \le n \le N_{ZC} - 1 \qquad \text{Equation 1}$$

The random access preamble (a sequence of the random access preamble) $x_{u,v}$ (n) is given by Equation (2) described below. $C_v$ is a value of the cyclic shift. X mod Y is a function which outputs a remainder acquired by dividing X by Y.

$$x_{u,v}(n)=x_u((n+C_v)\bmod N_{ZC}) \qquad \text{Equation 2}$$

In FIG. 1, the following uplink physical signal is used in the uplink radio communication. The uplink physical signal is not used for transmitting information output from the higher layer, but is used by the physical layer.

Uplink Reference Signal (UL RS)

According to the present embodiment, the following two types of uplink reference signals are used.

Demodulation Reference Signal (DMRS)
Sounding Reference Signal (SRS)

DMRS is associated with transmission of PUSCH or PUCCH. The DMRS is time-multiplexed with the PUSCH or the PUCCH. The base station apparatus 3 uses the DMRS in order to perform channel compensation of the PUSCH or the PUCCH.

Transmission of both of the PUSCH and the DMRS is hereinafter referred to simply as transmission of the PUSCH. Transmission of both of the PUCCH and the DMRS is hereinafter referred to simply as transmission of the PUCCH.

SRS is not associated with the transmission of PUSCH or PUCCH. The base station apparatus 3 may use the SRS for measuring the channel state. The SRS is transmitted in the last SC-FDMA symbol in the uplink subframe or the SC-FDMA symbol in an UpPTS.

In FIG. 1, the following downlink physical channels are used for downlink radio communication from the base station apparatus 3 to the terminal apparatus 1. The downlink physical channels are used by the physical layer for transmission of information output from the higher layer.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)
Physical Multicast CHannel (PMCH)

The PBCH is used for broadcasting a Master Information Block (MIB, a Broadcast CHannel (BCH)) that is shared in the terminal apparatuses 1. The MIB is transmitted at intervals of 40 ms, and, within the interval, the MIB is repeatedly transmitted every 10 ms. Specifically, initial transmission of the MIB is performed in a subframe 0 in a radio frame that satisfies SFN mod 4=0, and re-transmission (repetition) of the MIB is performed in subframes 0 in all the other radio frames. A system frame number (SFN) is a radio frame number. The MIB is system information. For example, the MIB includes information indicating the SFN.

The PCFICH is used for transmission of information indicating a region (OFDM symbols) to be used for transmission of the PDCCH.

The PHICH is used for transmission of an HARQ indicator for uplink data (Uplink Shared CHannel (UL-SCH)) received by the base station apparatus 3. The HARQ indicator indicates the HARQ-ACK.

The PDCCH and the EPDCCH are used to transmit Downlink Control Information (DCI). The downlink control information is also referred to as a DCI format. The downlink control information includes a downlink grant and an uplink grant. The downlink grant is also referred to as a downlink assignment or a downlink allocation.

One downlink grant is used for scheduling of one PDSCH within one serving cell. The downlink grant is used for the scheduling of the PDSCH within the same subframe as the subframe on which the downlink grant is transmitted.

One uplink grant is used for scheduling of one PUSCH within one serving cell. The uplink grant is used for scheduling of the PUSCH within the fourth or later subframe from the subframe in which the uplink grant is transmitted.

CRC parity bits added to a downlink grant or an uplink grant are scrambled with a Cell-Radio Network Temporary Identifier (C-RNTI), a Temporary C-RNTI, a Semi Persistent Scheduling (SPS) C-RNTI, and a Random Access-Radio Network Temporary Identifier (RA-RNTI). The C-RNTI and the SPS C-RNTI are identifiers for identifying a terminal apparatus within a cell. The Temporary C-RNTI is used during a contention based random access procedure. The RA-RNTI is used for scheduling of the random access response. The uplink grant to which the CRC parity bits scrambled with the RNTI are added is also referred to as an uplink grant for RNTI and an uplink grant corresponding to RNTI. The PDCCH including the uplink grant to which the CRC parity bits scrambled with the RNTI are added is also referred to as a PDCCH for RNTI, a PDCCH corresponding to RNTI, a PDCCH addressed to RNTI, or a PDCCH including RNTI.

The C-RNTI is used to control the PDSCH or the PUSCH in one subframe. The terminal apparatus 1 may transmit the PUSCH including the transport block based on the detection of the PDCCH including the uplink grant to which the CRC parity bits scrambled with the C-RNTI are added. Re-transmission of the transport block may be indicated by the PDCCH including the uplink grant to which the CRC parity bits scrambled with the C-RNTI are added.

The SPS C-RNTI is used to periodically allocate a resource for the PDSCH or the PUSCH. The terminal apparatus 1 detects the PDCCH including the uplink grant to which the CRC parity bits scrambled with the SPS C-RNTI are added, and in a case that the uplink grant is determined to be valid as an SPS activation command, stores the uplink grant as a configured uplink grant. A MAC layer of the terminal apparatus 1 considers the configured uplink grant to periodically occur. The subframe in which the configured uplink grant is considered to occur is given by a first period and a first offset. The terminal apparatus 1 receives information indicating the first period from the base station apparatus 3. The re-transmission of the transport block transmitted on the PUSCH periodically allocated is indicated by the uplink grant to which the CRC parity bits scrambled with the SPS C-RNTI are added. The configured uplink grant is also referred to as an uplink grant configured by Medium Access Control (MAC) or a first configured uplink grant.

The PDSCH is used to transmit downlink data (Downlink Shared CHannel (DL-SCH)). The PDSCH is used to transmit a random access message 2 (random access response). The PDSCH is used to transmit a handover command. The PDSCH is used to transmit system information including a parameter used for initial access.

The PMCH is used to transmit multicast data (Multicast CHannel (MCH)).

In FIG. 1, the following downlink physical signals are used for the downlink radio communication. The downlink physical signals are not used for transmission of information output from the higher layer, but are used by the physical layer.

Synchronization signal (SS)
Downlink Reference Signal (DL RS)

The synchronization signal is used for the terminal apparatus 1 to take synchronization in the frequency domain and the time domain in the downlink. The synchronization signal includes a Primary Synchronization Signal (PSS) and a Second Synchronization Signal (SSS).

The Downlink Reference Signal is used for the terminal apparatus 1 to perform channel compensation on a downlink physical channel. The downlink reference signal is used in order for the terminal apparatus 1 to obtain the downlink channel state information.

According to the present embodiment, the following seven types of downlink reference signals are used.

Cell-specific Reference Signal (CRS)
UE-specific Reference Signal (URS) relating to the PDSCH
Demodulation Reference Signal (DMRS) relating to the EPDCCH
Non-Zero Power Channel State Information—Reference Signal (NZP CSI-RS)
Zero Power Channel State Information—Reference Signal (ZP CSI-RS)
Multimedia Broadcast and Multicast Service over Single Frequency Network Reference signal (MBSFN RS)
Positioning Reference Signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

The base station apparatus 3 and the terminal apparatus 1 exchange (transmit and/or receive) a signal in the higher layer. For example, the base station apparatus 3 and the terminal apparatus 1 may transmit and/or receive Radio Resource Control (RRC) signaling (also referred to as RRC message or RRC information) in the RRC layer, respectively. Furthermore, the base station apparatus 3 and the terminal apparatus 1 may transmit and/or receive, in the Medium Access Control (MAC) layer, a MAC Control Element (CE). Here, the RRC signaling and/or the MAC CE is also referred to as higher layer signaling.

The PUSCH and the PDSCH are used to transmit the RRC signaling and the MAC CE. Here, the RRC signaling transmitted from the base station apparatus 3 on the PDSCH may be signaling common to multiple terminal apparatuses 1 in a cell. The RRC signaling transmitted from the base station apparatus 3 on the PDSCH may be signaling dedicated to a certain terminal apparatus 1 (also referred to as dedicated signaling or UE specific signaling). A cell-specific parameter may be transmitted by using the signaling common to the multiple terminal apparatuses 1 in the cell or the signaling dedicated to the certain terminal apparatus 1. A UE-specific parameter may be transmitted by using the signaling dedicated to the certain terminal apparatus 1.

Configurations of apparatuses according to the present embodiment will be described below.

Figure 4:
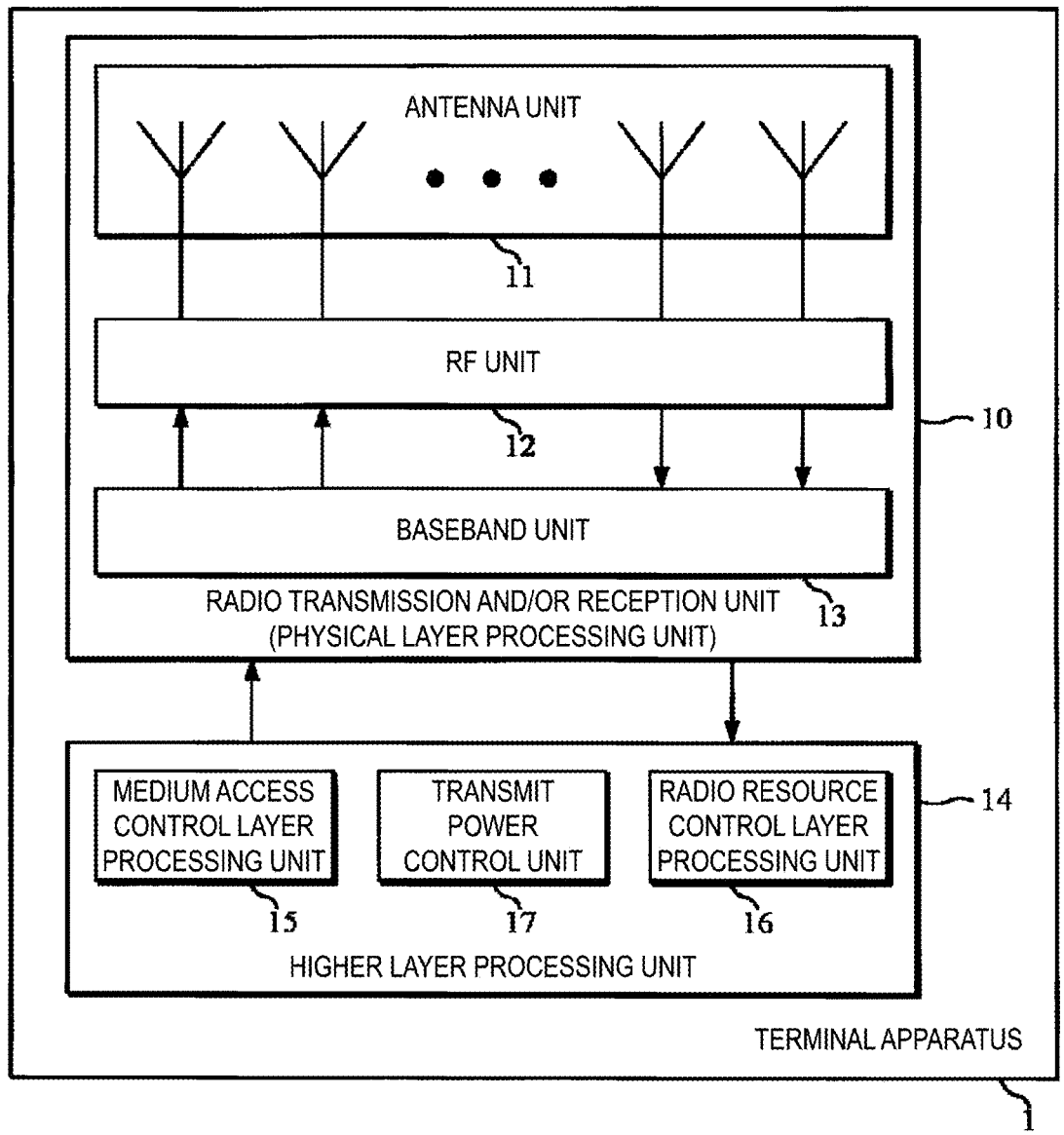
FIG. 4 is a schematic block diagram illustrating a configuration of a terminal apparatus 1 according to the present embodiment.

FIG. 4 is a schematic block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a radio frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the Medium Access Control layer. The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs processing of the Radio Resource Control layer. The radio resource control layer processing unit 16 manages various types of configuration information/parameters of its own apparatus. The radio resource control layer processing unit 16 sets various types of configuration information/parameters based on higher layer signaling received from the base station apparatus 3. Namely, the radio resource control layer processing unit 16 sets the various types of configuration information/parameters in accordance with the information indicating the various types of configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an SC-FDMA symbol by performing Inverse Fast Fourier Transform (IFFT) of the data, adds CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

Figure 5:
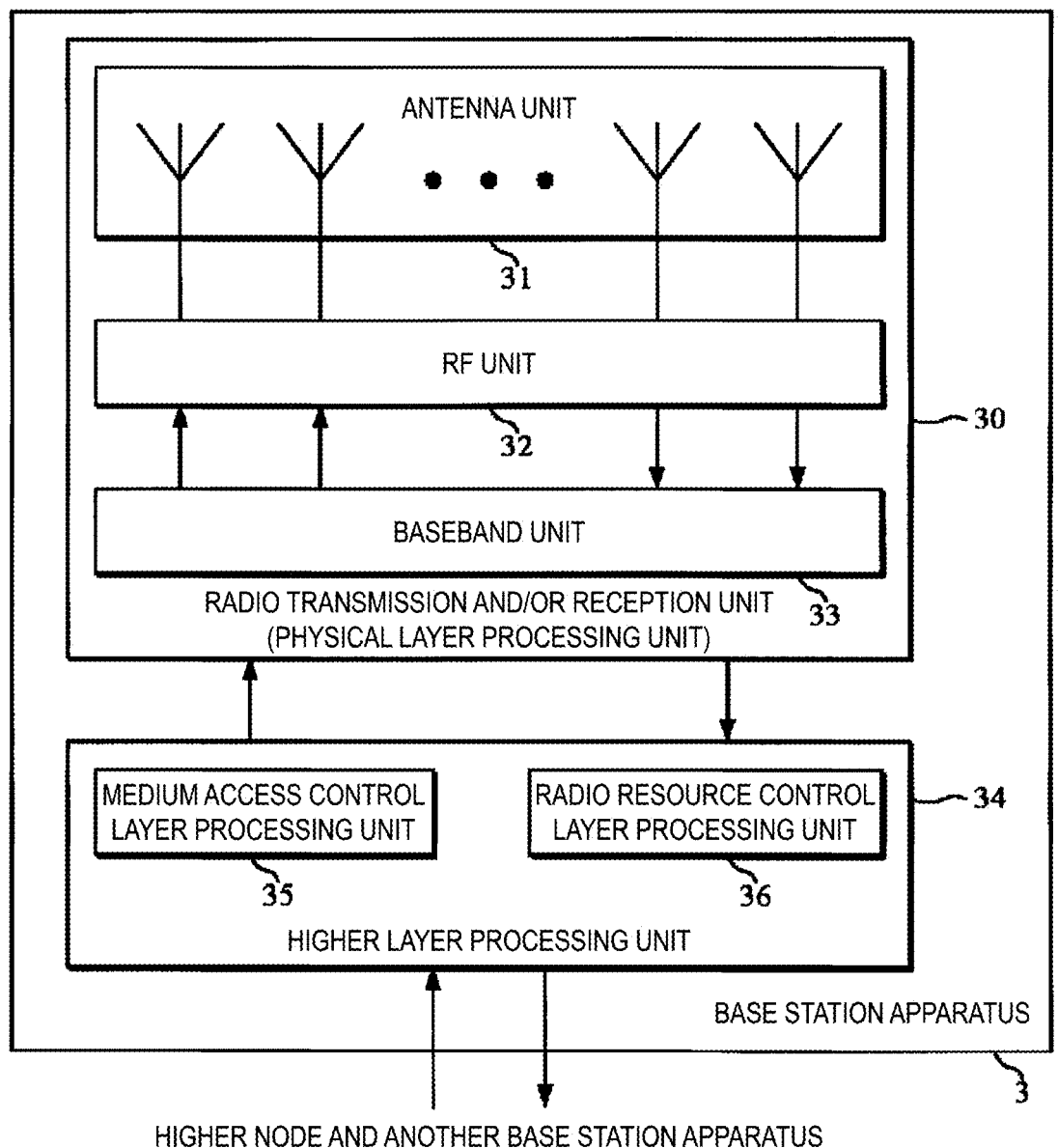
FIG. 5 is a schematic block diagram illustrating a configuration of a target base station apparatus 3B according to the present embodiment.

FIG. 5 is a schematic block diagram illustrating a configuration of the target base station apparatus 3B according to the present embodiment. As illustrated, the target base station apparatus 3B is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit. A configuration of the source base station apparatus 3A may be the same as the configuration of the target base station apparatus 3B.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 performs processing associated with a scheduling request, based on various types of configuration information/parameters managed by the radio resource control layer processing unit 36. The higher layer processing unit 34 may transmit information to other base station apparatuses and an MME/GW3C. The higher layer processing unit 34 may receive information from other base station apparatuses and the MME/GW3C.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via the higher layer signaling. Namely, the radio resource control layer processing unit 36 transmits/broadcasts information indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

The random access procedures are described in detail below. The random access procedure includes a contention based random access procedure and a non-contention based random access procedure. The contention based random access procedure includes a 2 step contention based random access procedure and a 4 step contention based random access procedure.

Figure 6:
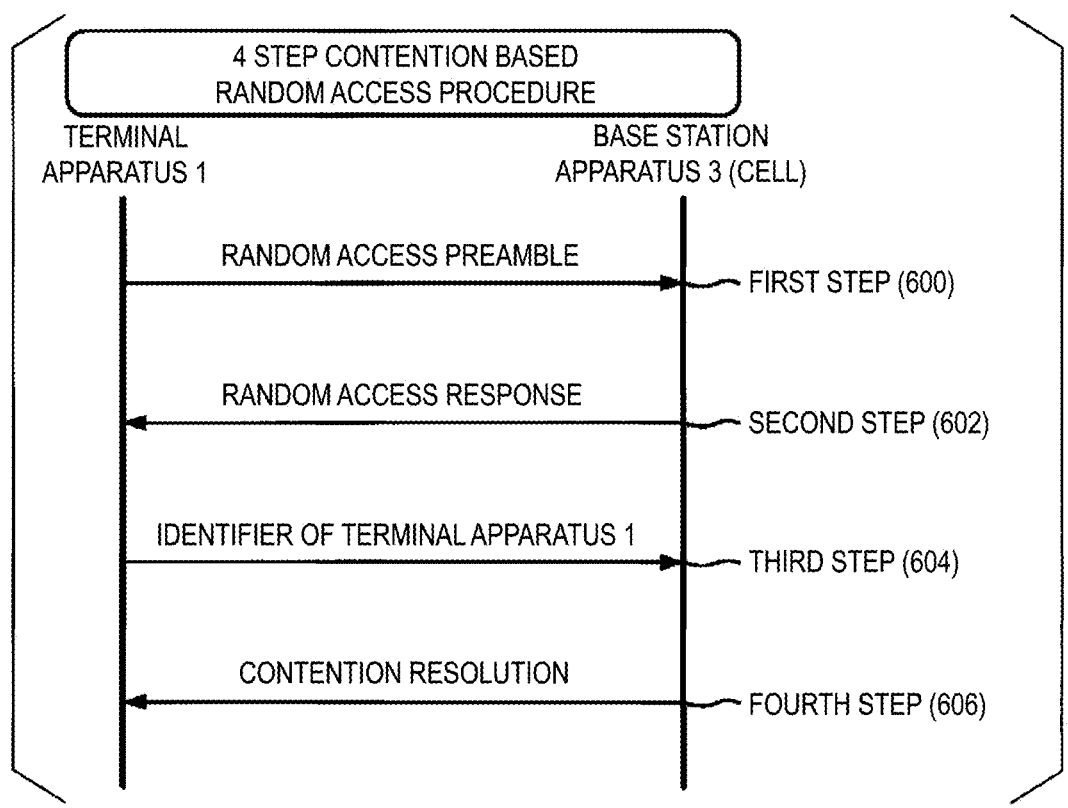
FIG. 6 is a diagram illustrating an example of a 4 step contention based random access procedure according to the present embodiment.

FIG. 6 is a diagram illustrating an example of the 4 step contention based random access procedure according to the present embodiment. The 4 step contention based random access procedure includes a first step (600), a second step (602), a third step (604), and a fourth step (606).

In the first step (600), the terminal apparatus 1 transmits the random access preamble. The random access preamble is included in the PRACH. In the first step (600), the MAC layer itself of the terminal apparatus 1 selects an index of the random access preamble. That is, in the first step (600), the base station apparatus 3 does not notify the terminal apparatus 1 of the index of the random access preamble.

In the second step (602), the terminal apparatus 1 receives the random access response. The random access response is included in the PDSCH. Here, the PDCCH for the RA-RNTI is used for scheduling of the PDSCH including the random access response. A value of the RA-RNTI may be given based on the PRACH resource used for transmission of the random access preamble in the first step (600). The random access response includes a random access preamble identifier indicating an index of the random access preamble, an uplink grant, information indicating the Temporary C-RNTI, and information indicating a timing advance. In a case that the random access response includes the random access preamble identifier corresponding to the random access preamble transmitted in the first step (600), the terminal apparatus 1 considers the random access response to have been successfully received.

In the third step (604), the terminal apparatus 1 transmits an identifier of the terminal apparatus 1. Here, the identifier of the terminal apparatus 1 may be the C-RNTI. The identifier of the terminal apparatus 1 or the C-RNTI is included in the PUSCH. Here, the PUSCH for the identifier of the terminal apparatus 1 or the C-RNTI is scheduled by the uplink grant included in the random access response.

In the fourth step (606), the terminal apparatus 1 receives a contention resolution. The contention resolution may be a UE contention resolution identifier or the C-RNTI. In a case that the terminal apparatus 1 has transmitted the C-RNTI on the PUSCH in the third step (604) and the terminal apparatus 1 receives the PDCCH for the C-RNTI, the terminal apparatus 1 may consider the contention resolution to be successful, and may consider the random access procedure to have been successfully completed.

Information indicating the UE contention resolution identifier is included in the PDSCH. Here, the PDCCH for the Temporary C-RNTI is used for scheduling of the PDSCH. In a case that (i) the terminal apparatus 1 has not transmitted the C-RNTI in the PUSCH of the third step (604), (ii) the terminal apparatus 1 has transmitted the identifier of the terminal apparatus 1 in the PUSCH of the third step (606), (iii) the terminal apparatus 1 receives the PDCCH for the Temporary C-RNTI, (iv) the PDSCH scheduled by the PDCCH includes the information indicating the UE contention resolution identifier, and (v) the UE contention resolution identifier and the identifier of the terminal apparatus 1 transmitted in the third step (606) match with each other, the terminal apparatus 1 may consider the contention resolution to be successful, and may consider the random access procedure to have been successfully completed.

Figure 7:
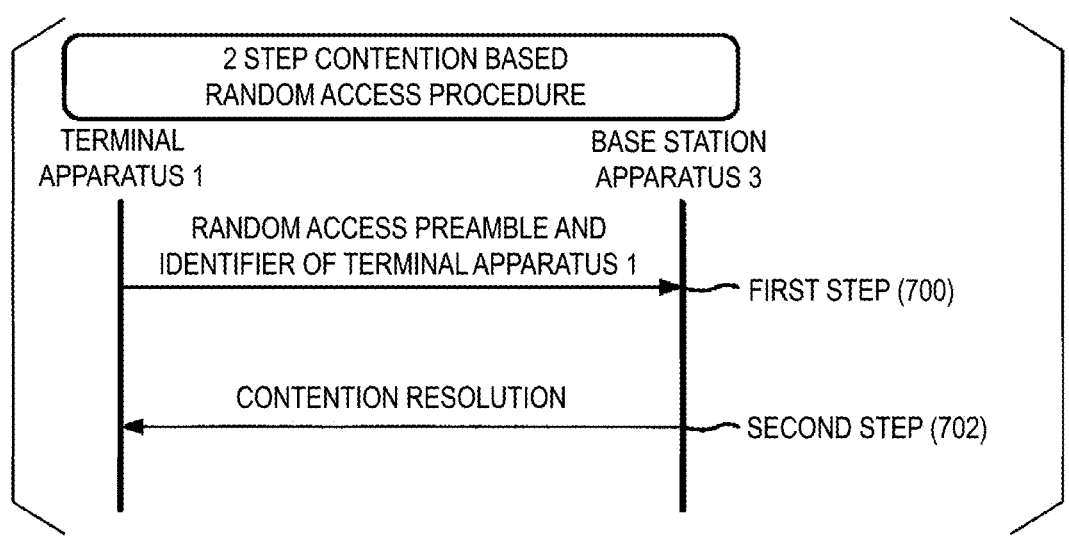
FIG. 7 is a diagram illustrating an example of a 2 step contention based random access procedure according to the present embodiment.

FIG. 7 is a diagram illustrating an example of the 2 step contention based random access procedure according to the present embodiment. The 2 step contention based random access procedure includes a first step (700) and a second step (702).

In the first step (700), the random access preamble and the identifier of the terminal apparatus 1 are transmitted. Here, the identifier of the terminal apparatus 1 may be the C-RNTI. The random access preamble may be included in the PRACH. The identifier of the terminal apparatus 1 may be included in PUSCH. The random access preamble and the identifier of the terminal apparatus 1 may be included in the same one physical channel. In the first step (700), the MAC layer itself of the terminal apparatus 1 selects the index of the random access preamble. That is, in the first step (700), the base station apparatus 3 does not notify the terminal apparatus 1 of the index of the random access preamble.

In the second step (702), the terminal apparatus 1 receives a contention resolution. The contention resolution may be the UE contention resolution identifier or the C-RNTI. In a case that the terminal apparatus 1 has transmitted the C-RNTI in the first step (700) and the terminal apparatus 1 receives the PDCCH including the C-RNTI, the terminal apparatus 1 may consider the contention resolution to be successful, and may consider the random access procedure to have been successfully completed.

The UE contention resolution identifier is included in the PDSCH. Here, for scheduling of the PDSCH, the DCI format having the CRC scrambled with an X-RNTI added thereto may be used. The X-RNTI may be given based at least on a resource (PRACH resource) used for transmission of the random access preamble in the first step (700) and/or a resource (PUSCH resource) used for transmission of the identifier of the terminal apparatus 1. The X-RNTI may be the RA-RNTI.

In a case that (i) the terminal apparatus 1 has not transmitted the C-RNTI in the first step (700), (ii) the terminal apparatus 1 has transmitted the identifier of the terminal apparatus 1 in the first step (700), (iii) the terminal apparatus 1 receives the PDCCH for the X-RNTI, (iv) the PDSCH scheduled by the PDCCH includes the information indicating the UE contention resolution identifier, and (v) the UE contention resolution identifier and the identifier of the terminal apparatus 1 transmitted in the first step (700) match with each other, the terminal apparatus 1 may consider the contention resolution to be successful, and may consider the random access procedure to have been successfully completed. The PDSCH scheduled by the PDCCH for the X-RNTI may include some or all of the uplink grant, the information indicating the C-RNTI, and the information indicating the timing advance. The PDSCH scheduled by the PDCCH for the X-RNTI may not include information indicating the index of the random access preamble. Here, the terminal apparatus 1 may set the C-RNTI to a value of the information indicating the C-RNTI.

Figure 8:
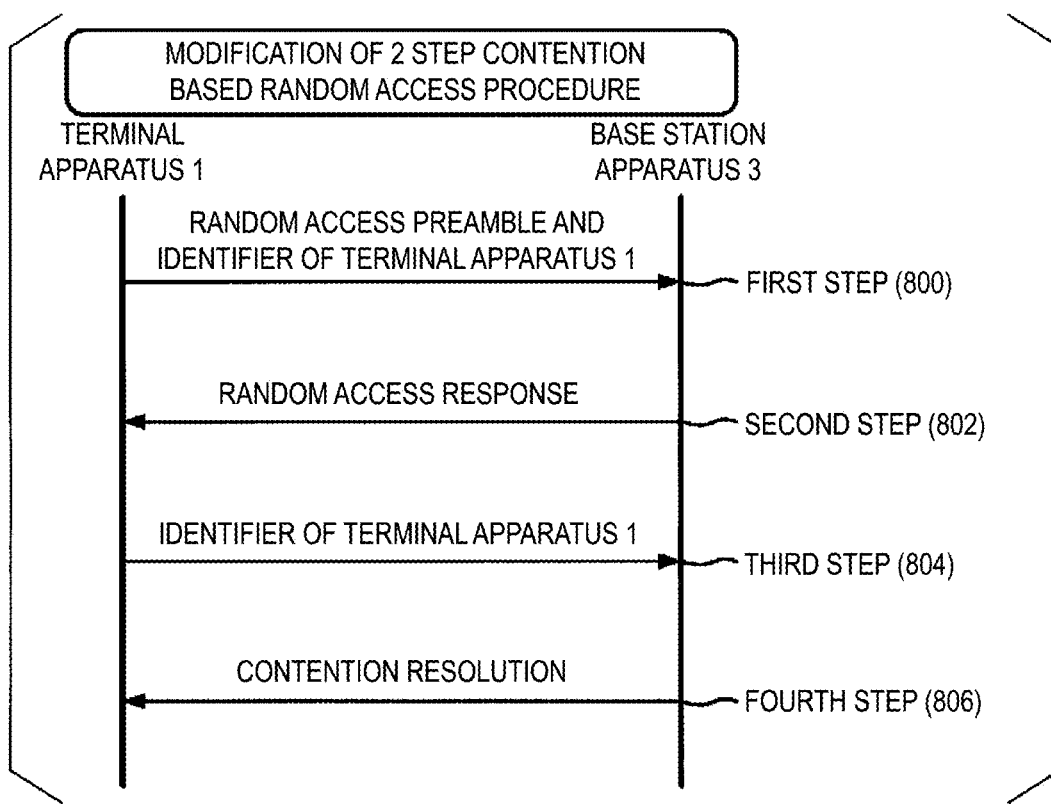
FIG. 8 is a diagram illustrating modification of the 2 step contention based random access procedure according to the present embodiment.

FIG. 8 is a diagram illustrating modification of the 2 step contention based random access procedure according to the present embodiment. The modification of the 2 step contention based random access procedure includes a first step (800), a second step (802), a third step (804), and a fourth step (806). The first step (800) is the same as the first step (700). The second step (802) is the same as the second step (602). The third step (804) is the same as the third step (604). The fourth step (806) is the same as the fourth step (606). In other words, after the first step of the 2 step random access procedure, transition from the 2 step contention based random access procedure to the 4 step contention based random access procedure may be performed.

In a case that the base station apparatus 3 detects the random access preamble and cannot detect the identifier of the terminal apparatus 1 in the first step (800), the base station apparatus 3 transmits the random access response in the second step (802). In other words, in a case that the base station apparatus 3 detects the random access preamble and cannot detect the identifier of the terminal apparatus 1 in the first step of the 2 step random access procedure, the second step of the 4 step random access procedure may be initiated by the base station apparatus 3. In a case that the base station apparatus 3 detects the random access preamble and the identifier of the terminal apparatus 1 in the first step of the 2 step random access procedure, the second step of the 2 step random access procedure may be initiated by the base station apparatus 3.

After the first step (700, 800) of the 2 step contention based random access procedure, the terminal apparatus 1 may monitor the contention resolution in the second step (702) and the random access response in the second step (802). In other words, in the second step (702, 802), the terminal apparatus 1 may monitor the PDCCH associated with the random access response and the PDCCH associated with the contention resolution. The PDCCH associated with the random access response may be the PDCCH for the RA-RNTI. The PDCCH associated with the contention resolution may be the PDCCH for the X-RNTI.

After the first step (600) of the 4 step contention based random access procedure, the terminal apparatus 1 may monitor the random access response of the second step (602). In other words, in the second step (602), the terminal apparatus 1 may monitor the PDCCH associated with the random access response. In the second step (602), the terminal apparatus 1 need not monitor the contention resolution. In other words, in the second step (602), the terminal apparatus 1 need not monitor the PDCCH associated with the contention resolution.

Figure 9:
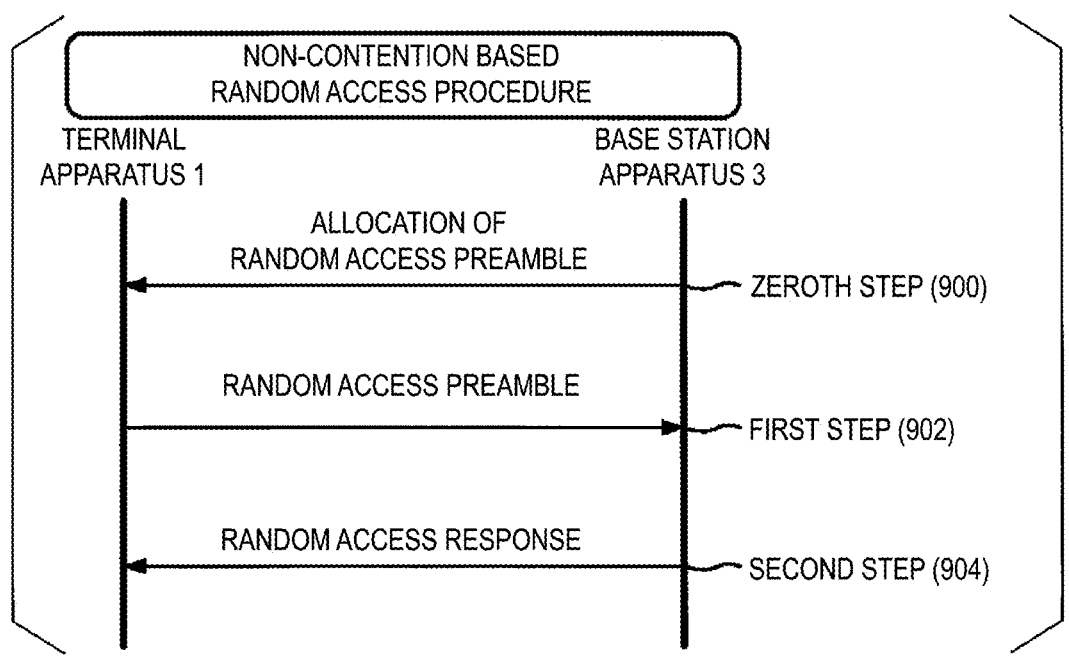
FIG. 9 is a diagram illustrating an example of a non-contention based random access procedure according to the present embodiment.

FIG. 9 is a diagram illustrating an example of the non-contention based random access procedure according to the present embodiment. The non-contention based random access procedure includes a zeroth step (900), a first step (902), and a second step (904).

In the zeroth step (900), the terminal apparatus 1 receives an allocation of the random access preamble. The allocation of the random access preamble may be included in a handover command or the PDCCH for the C-RNTI. The allocation of the random access preamble may indicate the index of the random access preamble. The PDCCH including the allocation of the random access preamble is also referred to as a PDCCH order or a PDCCH order indicating initiation of the random access procedure.

In the first step (902), the terminal apparatus 1 selects the random access preamble based on the allocation of the random access preamble, and transmits the selected random access preamble. The random access preamble is included in the PRACH. In the first step (902), the MAC layer itself of the terminal apparatus 1 does not select the index of the random access preamble.

In the second step (904), the terminal apparatus 1 receives the random access response. The random access response is included in the PDSCH. Here, the PDCCH for the RA-RNTI is used for scheduling of the PDSCH including the random access response. The value of the RA-RNTI may be given based on the PRACH resource used for transmission of the random access preamble in the first step (900). The random access response includes the random access preamble identifier indicating the index of the random access preamble, the uplink grant, the information indicating the Temporary C-RNTI, and the information indicating the timing advance. In a case that the random access response includes the random access preamble identifier corresponding to the random access preamble transmitted in the first step (900), the random access response is considered to be successfully received. In a case that the random access response includes the random access preamble identifier corresponding to the random access preamble transmitted in the first step (900), notification of the allocation of the random access preamble is performed, and the index of the random access preamble is not selected by the MAC itself of the terminal apparatus 1, the terminal apparatus 1 considers the random access procedure to have been successfully completed.

In the zeroth step (900), in a case that the allocation of the random access preamble indicates a first prescribed value, the terminal apparatus 1 may initiate the 4 step contention based random access procedure. In other words, a case that the MAC itself of the terminal apparatus 1 does not select the index of the random access preamble may be a case that the allocation of the random access preamble is not the first prescribed value.

In the zeroth step (900), in a case that the allocation of the random access preamble indicates a second prescribed value, the terminal apparatus 1 may initiate the 2 step contention based random access procedure. In other words, a case that the MAC itself of the terminal apparatus 1 does not select the index of the random access preamble may be a case that the allocation of the random access preamble is different from both the first prescribed value and the second prescribed value.

FIG. 10 is a diagram illustrating an example of a correspondence between an event and a form of the random access procedure according to the present embodiment. The random access procedure is performed for (event i) initial access from RRC_IDLE, (event ii) RRC connection re-establishment, (event iii) handover, (event iv) downlink data arrival during RRC_CONNECTED, (event v) uplink data arrival during RRC_CONNECTED, and (event vi) time adjustment for secondary TAG. The random access procedure for (event iv) downlink data arrival during RRC_CONNECTED may be performed in a case that a status of the uplink synchronization is asynchronous. The random access procedure for (event v) uplink data arrival during RRC_CONNECTED may be performed in a case that the status of the uplink synchronization is asynchronous, or in a case that there is no PUCCH resource for a scheduling request.

The random access procedure relating to the event i through the event v may be performed on the primary cell. The first step in the random access procedure relating to the event vi may be performed on the secondary cell. In other words, the random access procedure performed for (event vi) time adjustment for secondary TAG is initiated in the secondary cell belonging to the secondary TAG.

The random access procedure for (event i) initial access from RRC_IDLE may include the 4 step contention based random access procedure and the 2 step contention based random access procedure. The random access procedure for (event i) initial access from RRC_IDLE may not include the non-contention based random access procedure. The random access procedure for (event i) initial access from RRC_IDLE may be initiated by the RRC.

The random access procedure for (event ii) RRC connection re-establishment may include the 4 step contention based random access procedure and the 2 step contention based random access procedure. The random access procedure for (event ii) RRC connection re-establishment may not include the non-contention based random access procedure. The random access procedure for (event ii) RRC connection re-establishment may be initiated by the RRC.

The fact that the random access procedure includes the 4 step contention based random access procedure may be a fact that the 4 step contention based random access procedure is supported, the 4 step contention based random access procedure is valid, or the 4 step contention based random access procedure is applicable. The same applies to the 2 step contention based random access procedure and the non-contention based random access procedure.

The system information transmitted/broadcast by the base station apparatus 3 (cell) may include PRACH information and random access information. The PRACH information may include information indicating the PRACH resource, information relating to the physical root sequence index u relating to the random access preamble, and information relating to the cyclic shift $C_v$ for the random access preamble. The physical root sequence index u and the cyclic shift $C_v$ are used to determine the sequence of the random access preamble. The random access information may include information indicating the number of random access preambles and information indicating the number of random access preambles for the contention based random access procedure. Furthermore, the system information may include information for the 2 step contention based random access procedure. The information for the 2 step contention based random access procedure may include information indicating that the 2 step contention based random access procedure is supported in the cell, information indicating a resource for transmission of the identifier of the terminal apparatus 1 in the first step of the 2 step contention based random access procedure, information indicating a modulation scheme for data including the identifier of the terminal apparatus 1 in the first step of the 2 step contention based random access procedure and/or information indicating a threshold of Reference Signal Received Power (RSRP). Here, the system information does not include the allocation of the random access preamble for the zeroth step of the non-contention based random access procedure.

The terminal apparatus 1 measures the RSRP from the downlink reference signal of the cell. The terminal apparatus 1 may initiate any one of the 2 step contention based random access procedure and the 4 step contention based random access procedure based on the measured RSRP and the threshold of the RSRP. In a case that the measured RSRP does not exceed the threshold of the RSRP, the terminal apparatus 1 may initiate the 4 step contention based random access procedure. In a case that the measured RSRP exceeds the threshold of the RSRP, the terminal apparatus 1 may initiate the 2 step contention based random access procedure.

The random access procedure for (event iii) handover may include the 4 step contention based random access procedure, the 2 step contention based random access procedure, and the non-contention based random access procedure. The handover command may include the above-described PRACH information, the above-described random access information, the above-described information for the 2 step contention based random access procedure, and/or the allocation of the random access preamble for the zeroth step of the non-contention based random access procedure.

The terminal apparatus 1 may initiate, based on the information included in the handover command, any one of the 4 step contention based random access procedure, the 2 step contention based random access procedure, and the non-contention based random access procedure.

In a case that the handover command includes the allocation of the random access preamble, the terminal apparatus 1 may initiate the non-contention based random access procedure.

In a case that the handover command does not include the allocation of the random access preamble and the handover command includes the information for the 2 step contention based random access procedure, the terminal apparatus 1 may initiate, based on the measured RSRP and the threshold of the RSRP, any one of the 2 step contention based random access procedure and the 4 step contention based random access procedure.

In a case that the handover command does not include the allocation of the random access preamble and the handover command includes the information for the 2 step contention based random access procedure, the terminal apparatus 1 may initiate, based on the measured RSRP and the threshold of the RSRP, any one of the 2 step contention based random access procedure and the 4 step contention based random access procedure. Here, in a case that the measured RSRP does not exceed the threshold of the RSRP, the terminal apparatus 1 may initiate the 4 step contention based random access procedure. Here, in a case that the measured RSRP exceeds the threshold of the RSRP, the terminal apparatus 1 may initiate the 2 step contention based random access procedure.

In a case that the handover command includes the allocation of the random access preamble and the allocation of the random access preamble indicates the first prescribed value, the terminal apparatus 1 may initiate the 4 step contention based random access procedure.

In a case that the handover command includes the allocation of the random access preamble, the allocation of the random access preamble indicates the second prescribed value, and the handover command includes the information for the 2 step contention based random access procedure, the terminal apparatus 1 may initiate the 2 step contention based random access procedure.

In a case that the handover command does not include the allocation of the random access preamble and the handover command does not include the information for the 2 step contention based random access procedure, the terminal apparatus 1 may initiate the 4 step contention based random access procedure.

The random access procedure for (event iv) downlink data arrival during RRC_CONNECTED may include the 4 step contention based random access procedure and the non-contention based random access procedure. The random access procedure for (event iv) downlink data arrival during RRC_CONNECTED may not include the 2 step contention based random access procedure. The random access procedure for (event iv) downlink data arrival during RRC_CONNECTED is initiated by the PDCCH order.

In a case that the allocation of the random access preamble included in the PDCCH order is a value other than the first prescribed value, the terminal apparatus 1 may initiate the non-contention based random access procedure. In a case that the allocation of the random access preamble included in the PDCCH order is the first prescribed value, the terminal apparatus 1 may initiate the 4 step contention based random access procedure. Even in a case that the allocation of the random access preamble included in the PDCCH order is the second prescribed value, the terminal apparatus 1 may initiate the 4 step contention based random access procedure.

The random access procedure for (event v) uplink data arrival during RRC_CONNECTED may include the 4 step contention based random access procedure and the 2 step contention based random access procedure. The random access procedure for (event v) uplink data arrival during RRC_CONNECTED may not include the non-contention based random access procedure. The random access procedure for (event v) uplink data arrival during RRC_CONNECTED is initiated by the MAC itself.

The random access procedure performed for (event vi) time adjustment for secondary TAG is initiated by the PDCCH order. In other words, the allocation of the random access preamble included in the PDCCH order indicating the initiation of the random access procedure in the secondary cell indicates a value other than the first prescribed value.

FIG. 11 is a diagram illustrating another example of the correspondence between the event and the form of the random access procedure according to the present embodiment. The random access procedure is initiated by (event A) RRC, (event B) MAC itself, or (event C) PDCCH order.

The random access procedure initiated by (event A) RRC may include the 4 step contention based random access procedure, the 2 step contention based random access procedure, and the non-contention based random access procedure.

The random access procedure initiated by (event B) MAC itself may include the 4 step contention based random access procedure and the 2 step contention based random access procedure. The random access procedure initiated by (event B) MAC itself may not include the non-contention based random access procedure.

The random access procedure initiated by the PDCCH order may include the 4 step contention based random access procedure and the non-contention based random access procedure. The random access procedure initiated by the PDCCH order may not include the 2 step contention based random access procedure.

The random access procedure initiated in the primary cell based on (event C) PDCCH order may include the 4 step contention based random access procedure and the non-contention based random access procedure. The random access procedure initiated in the primary cell based on (event C) PDCCH order may not include the 2 step contention based random access procedure.

The random access procedure initiated in the secondary cell based on (event D) PDCCH order may include the non-contention based random access procedure. The random access procedure initiated in the secondary cell based on (event D) PDCCH order may not include the 4 step contention based random access procedure and the 2 step contention based random access procedure.

Various aspects of the terminal apparatus 1 according to the present embodiment will be described below.

(1) A first aspect of the present embodiment is a terminal apparatus 1, the terminal apparatus 1 includes: a higher layer processing unit 14 configured to perform a random access procedure; and a receiver 10 configured to receive a physical channel (PDCCH order), in which the random access procedure includes a 2 step contention based random access procedure, a 4 step contention based random access procedure, and a non-contention based random access procedure, the physical channel indicates an initiation of any of the 4 step contention based random access procedure and the non-contention based random access procedure, and the higher layer processing unit initiates, based on the physical channel, any of the 4 step contention based random access procedure and the non-contention based random access procedure.

(2) In the first aspect of the present embodiment, the higher layer processing unit 14 may initiates, for initial access and RRC connection re-establishment, any of the 2 step contention based random access procedure and the 4 step contention based random access procedure.

(3) In the first aspect of the present embodiment, the higher layer processing unit 14 may initiate, for a handover, any of the 2 step contention based random access procedure, the 4 step contention based random access procedure, and the non-contention based random access procedure.

(4) In the first aspect of the present embodiment, in a case that a MAC layer initiates the random access procedure, the higher layer processing unit 14 may initiate any of the 2 step contention based random access procedure and the 4 step contention based random access procedure.

(5) In the first aspect of the present embodiment, in a case that the physical channel indicates an initiation of the random access procedure in a secondary cell belonging to a secondary timing advance group (TAG), the physical channel may indicate an initiation of the non-contention based random access procedure.

According to this configuration, the terminal apparatus and the base station apparatus can mutually efficiently perform the random access procedure.

The base station apparatus 3 according to one aspect of the present invention can also be realized as an aggregation (an apparatus group) including multiple apparatuses. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

A program running on an apparatus according to one aspect of the present invention may serve as a program that controls a Central Processing Unit (CPU) and the like to cause a computer to operate in such a manner as to realize the functions of the above-described embodiment according to one aspect of the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the apparatuses in the above-described embodiment may be partially enabled by a computer. In such a case, a program for realizing such control functions may be recorded on a computer-readable recording medium to cause a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may be constituted of a digital circuit, or may be constituted of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal device comprising:
reception circuitry configured to:
receive system information including random-access information and a Reference Signal Received Power (RSRP) threshold for a 2-step contention based random-access procedure, and
receive an indication for handover from a first cell; and
higher layer processing circuitry configured to initiate, based on information included in the indication for handover, one of the 2-step contention based random-access procedure, a 4-step contention based random-access procedure, and a non-contention based random-access procedure, wherein:
the non-contention based random-access procedure is initiated on a second cell based on an allocation of a random-access resource in a case that the indication for handover includes the allocation of the random-access resource;
the 4-step contention based random-access procedure is initiated on the second cell based on the random-access information included in the received system information in a case that the indication for handover does not include the allocation of the random-access resource and a cell-level RSRP of a downlink reference signal of the second cell is not above the RSRP threshold included in the received system information, the cell-level RSRP being measured by the terminal device; and
the 2-step contention based random-access procedure is initiated on the second cell based on the random-access information included in the received system information in a case that the indication for handover does not include the allocation of the random-access resource and the cell-level RSRP is above the RSRP threshold included in the received system information.

2. A base station device comprising:
transmission circuitry configured to transmit system information including random-access information and a Reference Signal Received Power (RSRP) threshold for a 2-step contention based random-access procedure, and
transmit an indication for handover via a first cell; and
higher layer processing circuitry configured to:
indicate, to a terminal device, to initiate a non-contention based random-access procedure on a second cell by including an allocation of a random-access resource in the indication for handover, and
indicate, to the terminal device, to initiate one of a 4-step contention based random-access procedure and the 2-step contention based random-access procedure by not including the allocation of the random-access resource in the indication for handover, wherein:
the 4-step contention based random-access procedure is initiated on the second cell based on the random-access information included in the transmitted system information in a case that the indication for handover does not include the allocation of the random-access resource and a cell-level RSRP of a downlink reference signal of the second cell is not above the RSRP threshold included in the transmitted system information, the cell-level RSRP being measured by the terminal device; and
the 2-step contention based random-access procedure is initiated on the second cell based on the random-access information included in the transmitted system information in a case that the indication for handover does not include the allocation of the random-access resource and the cell-level RSRP is above the RSRP threshold included in the transmitted system information.

3. A communication method performed by a terminal device, the communication method comprising:
receiving system information including random-access information and a Reference Signal Received Power (RSRP) threshold for a 2-step contention based random-access procedure;
receiving an indication for handover from a first cell; and
initiating, based on information included in the indication for handover, one of the 2-step contention based random-access procedure, a 4-step contention based random-access procedure, and a non-contention based random-access procedure, wherein:
the non-contention based random-access procedure is initiated on a second cell based on an allocation of a random-access resource in a case that the indication for handover includes the allocation of the random-access resource;
the 4-step contention based random-access procedure is initiated on the second cell based on the random-access information included in the received system information in a case that the indication for handover does not include the allocation of the random-access resource and a cell-level RSRP of a downlink reference signal of the second cell is not above the RSRP threshold included in the received system information, the cell-level RSRP being measured by the terminal device; and
the 2-step contention based random-access procedure is initiated on the second cell based on the random-access information included in the received system information in a case that the indication for handover does not include the allocation of the random-access resource and the cell-level RSRP is above the RSRP threshold included in the received system information.

4. A communication method performed by a base station device, the communication method comprising:
transmitting system information including random-access information and a Reference Signal Received Power (RSRP) threshold for a 2-step contention based random-access procedure;
transmitting an indication for handover via a first cell;
indicating, to a terminal device, to initiate a non-contention based random-access procedure on a second cell by including an allocation of a random-access resource in the indication for handover; and
indicating, to the terminal device, to initiate one of a 4-step contention based random-access procedure and the 2-step contention based random-access procedure by not including the allocation of the random-access resource in the indication for handover, wherein:
the 4-step contention based random-access procedure is initiated on the second cell based on the random-access information included in the transmitted system information in a case that the indication for handover does not include the allocation of the random-access resource and a cell-level RSRP of a downlink reference signal of the second cell is not above the RSRP threshold included in the transmitted system information, the cell-level RSRP being measured by the terminal device; and
the 2-step contention based random-access procedure is initiated on the second cell based on the random-access information included in the transmitted system information in a case that the indication for handover does not include the allocation of the random-access resource and the cell-level RSRP is above the RSRP threshold included in the transmitted system information.

\* \* \* \* \*